United States Patent [19]

Fuhr et al.

[11] Patent Number: 4,973,196
[45] Date of Patent: Nov. 27, 1990

[54] PROCESS FOR THE INTERMEDIATE SEALING OF DUMPS

[75] Inventors: Hartmut Fuhr, Pittsburgh, Pa.; Bernd Koglin, Bergisch Gladbach, Fed. Rep. of Germany; Rolf Rink, Colonge; Josef Schäfer, Leverkusen, Fed. Rep. of Germany; Wolfgang Vogel, Siegburg, Fed. Rep. of Germany

[73] Assignee: Bayer Aktiengesellschaft, Leverkusen, Fed. Rep. of Germany

[21] Appl. No.: 441,724

[22] Filed: Nov. 27, 1989

[30] Foreign Application Priority Data

Dec. 15, 1988 [DE] Fed. Rep. of Germany ....... 3842212

[51] Int. Cl.$^5$ ................................................ B09B 1/00
[52] U.S. Cl. ..................................... 405/129; 405/36; 405/52; 405/270
[58] Field of Search ................. 405/128, 129, 270, 52, 405/53, 86, 36

[56] References Cited

U.S. PATENT DOCUMENTS

| | | | |
|---|---|---|---|
| 3,586,624 | 6/1971 | Larson | 405/36 X |
| 3,705,851 | 12/1972 | Brauer | 405/36 X |
| 4,519,338 | 5/1985 | Kramer et al. | 405/128 X |
| 4,565,468 | 1/1986 | Crawford | 405/129 X |
| 4,696,599 | 9/1987 | Rakocynski et al. | 405/129 |
| 4,768,897 | 9/1988 | Nussbaumer et al. | 405/128 |

Primary Examiner—Dennis L. Taylor
Assistant Examiner—Arlen L. Olsen
Attorney, Agent, or Firm—Sprung Horn Kramer & Woods

[57] ABSTRACT

In an operating dump, intermediate sealing layers which are provided with a drainage layer are applied for the production of a multibarrier system to prevent the penetration of seepage water, the seepage water which is collected in the drainage layer being removed and fed to a disposal system. Plastic films or sheets overlapping in the form of roofing tiles or laid as webs have proved suitable as an intermediate covering.

18 Claims, 3 Drawing Sheets

PROCESS FOR THE INTERMEDIATE SEALING OF DUMPS

BACKGROUND OF THE INVENTION

The invention relates to a process for the intermediate sealing of the relevant upper waste layers of an operating dump and for the production of a multibarrier system to prevent seepage water penetrating into the body of the dump by means of intermediate covering of the dump layers.

An important task in the operation of dumps is to keep the amount of seepage water as small as possible. For this purpose, in the present state-of-the-art, waste is filled in layers having a height of, for example, 10 m and is covered with a layer of loam or other suitable material in a height of, for example 30 cm. The seepage waters obtained on these intermediate layers after further deposition are collected and treated.

On the basis of the state-of-the-art, the following requirements have now emerged with regard to the prevention or minimisation of seepage water in dumps:

By means of suitable technical measures, the entry of precipitation into the body of the dump should be minimised.

Precipitation should be kept away from the fill area by covering or sealing.

Fill areas which are neither covered nor sealed at the ends must have intermediate seals. Suitable materials for the intermediate seals are both the plastic web and cohesive earth material.

Plastic films which are laid in the form of roofing tiles, loosely or welded to one another, must be weighted down against gusts of wind. They must have high tensile strength and be weather-resistant.

The intermediate seal of cohesive material should have a minimum thickness of 20 cm after installation. The surface must be rolled smooth and protected from drying out or the effects of frost.

Before the fill areas with intermediate seals are put into operation again, the plastic films must be removed and the cohesive intermediate seals must be connected to the central seepage water disposal by additional measures.

According to the state-of-the-art described, the entry of precipitation into the dump and consequently the formation of seepage water can be reduced by intermediate seals of cohesive material.

A disadvantage of the mineral intermediate seal of cohesive material is its considerable volume, which is removed from the dump volume available for waste fill. Both for domestic waste and for commercial or industrial wastes and for special waste, the available dump volume is steadily becoming scarcer in all highly developed countries. This aspect is therefore becoming more and more important.

The penetration of precipitation into the waste layers of the dump and hence the formation of seepage water can be avoided by means of intermediate seals of plastic films. However, because of the regulation which prescribes that the plastic films have to be removed before the fill areas with intermediate seals are put into operation again, the intermediate covering films cannot be used as a permanent multibarrier system against seepage water. Consequently, precipitation which enters the surface of the waste if the intermediate covering made of plastic is damaged penetrates the entire body of the dump as far as the base. Furthermore, seepage waters released through dehumidification of higher waste layers penetrate the entire dump body underneath, as far as the base. Along this route through the body of the waste, further elution of the wastes and hence further enrichment of the seepage waters with pollutants must be expected.

SUMMARY OF THE INVENTION

It is the object of the invention to provide dumps having water-tight, compact intermediate seals with the maximum possible ecological safety.

This object is achieved, according to the invention, by a process in which individual dump layers are separated from one another by intermediate coverings which are provided with a drainage layer, and the seepage water which has collected in the drainage layer is removed and fed to a seepage water disposal system. These are stationary intermediate coverings which require substantially less space than the known intermediate seals of cohesive earth material and which remain in the dump, contrary to the guidelines of the state-of-the-art.

Plastic films or sheets overlapping in the form of roofing tiles or laid as webs are preferably used for the intermediate seal.

Alternatively, the intermediate covering can also be applied in the form of layers which predominantly consist of wastes such as building rubble, minerals resembling building rubble and excavated earth.

Particularly suitable materials for the drainage layer are plant substrates of the particle fractions sand and gravel, at least 95% of which is in the size range from 0.06 mm to 40 mm. The size range is preferably from 1 mm to 30 mm. Other suitable materials are rough and porous rocks. A substrate mixture of which the mechanical stability has been increased by admixing up to 5% of bentonite is preferred. The thickness of the plant substrate layer is 20 mm to 100 mm, preferably 30 mm to 60 mm.

HDPE webs or HDPE sheets which are welded to one another or laid in an overlapping manner are preferably used for the intermediate covering consisting of plastic films or plastic sheets. The thickness of the HDPE web or plate material is advantageously in the range from 1 mm to 3 mm. By means of structures (for example ribs or knobs) on the HDPE surface, the drainable material layer is held (anchoring points).

In a further development of the invention, a finely divided hardening, water-insoluble suspension is filtered into the intermediate covering from a layer of building rubble, material resembling building rubble or excavated earth. Particularly suitable for this purpose are suspensions which contain binders, such as, for example, waterglass or silica sol. These measures are used for sealing the intermediate spaces and for consolidating the intermediate covering. The infiltration of the sealing suspension into the upper waste layer can be effected by reduced pressure from below or by excess pressure from above. In the case of suction by means of reduced pressure, air is sucked out of the waste layer using a lance. To suppress the inflow of air from adjacent surface areas, these are expediently covered with a film. In the case of forcing in by means of excess pressure, a pressure bell is inverted over the area to be sealed, and the sealing suspension is introduced and then forced into the soil under excess pressure.

Intermediate sealing of the dump can advantageously be effected by pumping a free-flowing, highly concentrated suspension of fine particles of building rubble, minerals resembling building rubble and excavated earth onto the waste surface by means of a fan jet. Binders in the form of silica sol or waterglass are preferably added to the suspension.

In an alternative process for the production of the intermediate seal, slabs or blocks are produced by compressing wastes comprising building rubble, minerals resembling building rubble and excavated earth, to which binders have been added, under high pressures of 10 to 300 bar, preferably 30 bar to 150 bar, and the said slabs or blocks are then laid in the form of building blocks or roofing tiles. Once again, waterglass, silica sol or even cement is suitable as the binder.

The joints remaining between the slabs or blocks are advantageously closed with a hardening, water-insoluble suspension. In principle, the same procedure is adopted as for infiltration of a hardening, water-insoluble suspension into the intemediate covering (see above).

During compression, that surface of the upper slabs or blocks which faces upwards can be structured in order to provide a means of attachment for the drainable material to be placed on top.

Before fill areas with intermediate seals are put into operation again, the intermediate sealing and drainage layers are connected to the seepage water disposal system.

Compared with the prior art, the process described, in all variants described, has the advantage that a permanent intermediate seal is realised, without loss of dump volume.

In contrast to the known prior art, it has been found that plastic intermediate seals too can be connected to a drainage system and can be designed so that they need not be removed before the fill areas with intermediate seals are put into operation again, but can be connected to the seepage water disposal system.

It has also been found that wastes such as building rubble, minerals resembling building rubble or excavated earth may even account for a significant part of the intermediate seal. Thus, the requirement to utilise wastes is fulfilled in an unexpected manner.

This process can be used in all dumps for special wastes, industrial or commercial wastes or domestic waste. Compared with the prior art, it saves valuable proportions of dump volume and considerably reduces the amount of resulting seepage water and the amount of eluted pollutants.

The invention is described in detail below with reference to Illustrative Examples and drawings.

BRIEF DESCRIPTION OF THE DRAWINGS

FIG. schematically shows the structure of a dump set up by the process according to the invention, having intermediate sealing of the waste layers.

DETAILED DESCRIPTION OF THE INVENTION

Figure 1:
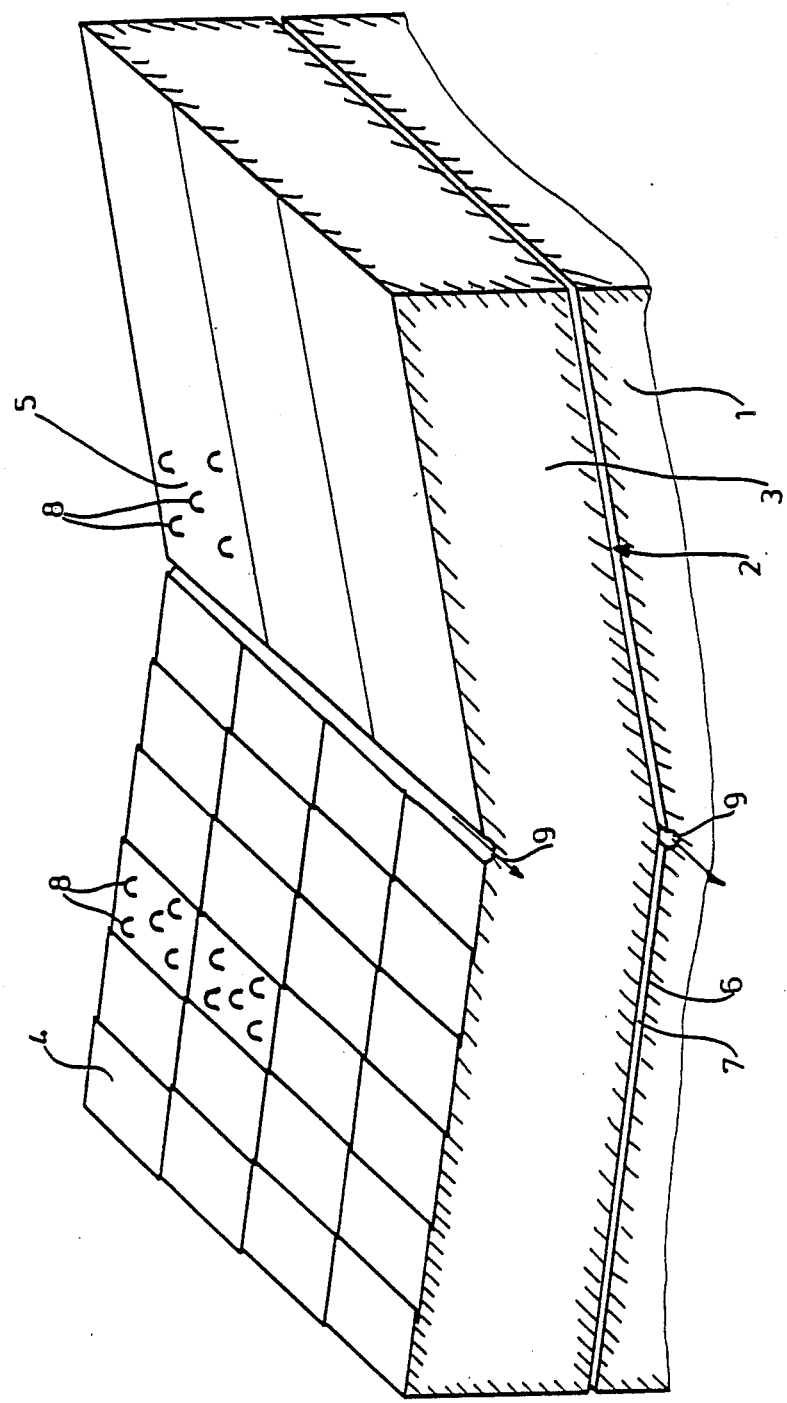

The dump shown in FIG. 1 consists of a lower waste layer 1, which is covered by an intermediate seal 2, and a subsequent upper waste layer 3, the surface of which is covered with plastic sheets 4, laid to overlap in the form of roofing tiles, or welded plastic webs 5. The waste layers 1 and 3 have, for example, a thickness of 10 m and consist of, for example, special wastes of dump class 5. The intermediate seal 2 consists of a combination of a plastic covering 6 with a drainage layer 7 on top. The plastic covering 6 of the intermediate seal 2 has the same structure as the upper intermediate covering which consists of plastic sheets 4 or plastic webs 5 and has not yet been covered with further wastes.

The material used is high pressure polyethylene (HDPE). The thickness of the webs or sheets is, for example, 2 mm. To increase the surface static friction, knobs 8 are stamped in the plastic sheets 4 or plastic webs 5.

A plant substrate layer of the particle fractions sand and gravel, having a predominant particle size in the range from 1 mm to 30 mm, serves as the drainage layer 7. The thickness of the plant substrate layer is, for example, 40 mm. Mechanical stability can be increased by admixing up to 5% of bentonite. Rough and porous rocks in the same particle size range are also suitable as material for the plant substrate layer 7. A drainage layer of this type is applied in each case to the upper intermediate seal consisting of plastic sheets 4 or plastic webs 5 and not yet covered with wastes. By means of the structures 8 on the surface of the plastic covering 6, the drainage layer 7 is provided with anchoring points. When the dump has a V-shaped or funnel-like structure, the rainwater or seepage water collects at the lowest point 9 of the intermediate seal 2 or of the surface covering 4, 5 and can be fed to a seepage water or rainwater disposal system. According to the guidelines to date, the plastic covering 4, 5 had to be removed before the dump was put into operation again, so that it could not perform the function of an intermediate seal.

Instead of plastic sheets or webs, it is also possible to use mineral layers for the intermediate seal, the said mineral layers being produced by infiltration of finely divided, hardenable, water-insoluble suspensions. Such a mineral sealing layer is obtained, for example, when a finely divided clay suspension to which binders, such as waterglass, have been added is infiltrated into a layer of fine procesed building rubble or mineral material resembling building rubble or excavated earth. Silica sol has proved particularly suitable as a water-soluble binder, sealant and stabilizer.

Figure 2:
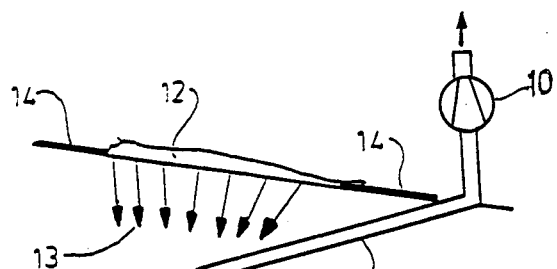
FIG. 2 shows the introduction of a sealing suspension into a particulate waste layer by means of reduced pressure.

The infiltration can be effected according to FIG. 2 with the aid of a vacuum lance 11 connected to a vacuum pump 10. The sealing suspension 12 is then poured onto the surface of the above-mentioned porous mineral sealing layer 13, which, for example, is applied to the upper waste layer 3, and, as a result of the reduced pressure, is sucked into the intermediate spaces 14 of the porous mineral waste layer 13. To prevent the inflow of air from the areas not wet with the sealing suspension, these areas are advantageously temporarily covered with a protective film 14.

Figure 4A:
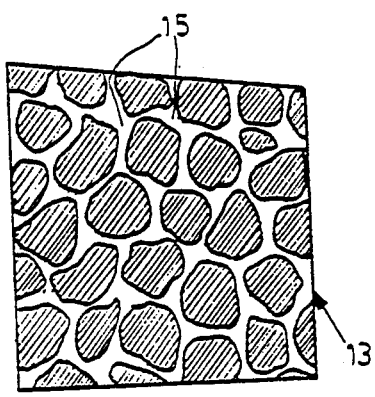
FIG. 4a to FIG. 4c shows cross-sections through a waste layer before, during and after treatment by the process according to FIG. 2 to 3.
Figure 4B:
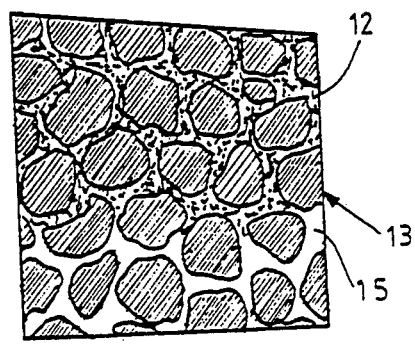
Figure 4C:
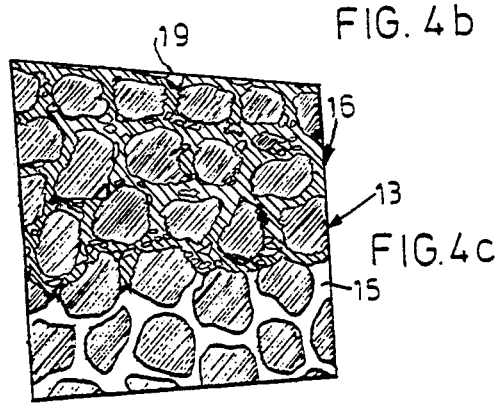

FIG. 4a shows the porous waste layer 13 with the intermediate spaces 15 before the treatment, and FIG. 4b shows this waste layer during the treatment, in which the upper intermediate spaces are filled with the initially free-flowing sealing suspension 12, which then solidifies to form the solid mineral sealing layer 16 (FIG. 4c).

Figure 3:
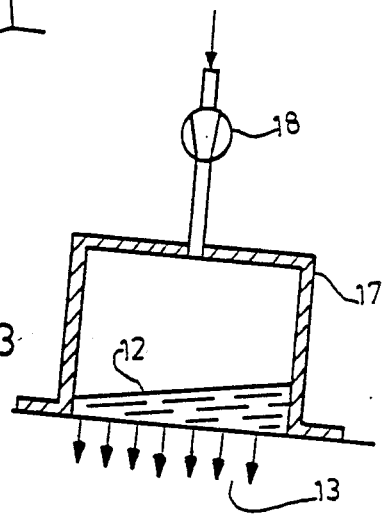
FIG. 3 shows the introduction of a sealing suspension into the waste layer by means of excess pressure.

Alternatively, as shown in FIG. 3, the sealing suspension 12 can be forced with the aid of an inverted pressure bell 17 with a connected compressor 18 into the mineral waste layer 13. The surface of the mineral intermediate seal 13 may additionally be sealed with an inert layer 19 having a thickness of, for example, 2 mm and consisting of waterglass, silica sol or other binders (see FIG. 4c).

Figure 5:
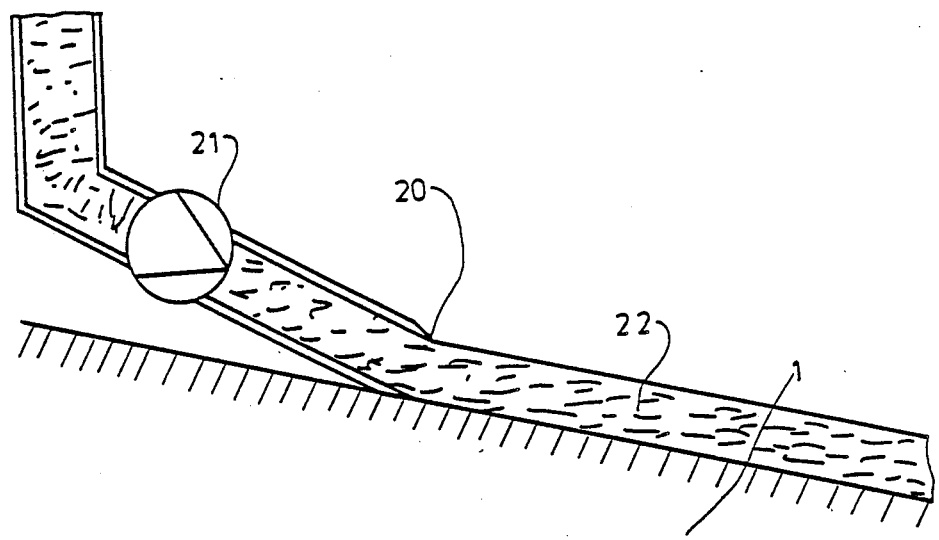
FIG. 5 shows the production of an intermediate covering by pouring a free-flowing and subsequently solidifying layer on top and FIG. 6 shows an intermediate seal based on compressed waste blocks or waste slabs.

According to FIG. 5, another method for producing a mineral intermediate seal 16 consists in pumping a free-flowing, highly concentrated suspension of fine particles of the materials building rubble, minerals resembling building rubble or excavated earth, to which binders have been added, onto the waste layer 1 by means of a fan jet 20 and sludge pump 21. The free-flowing layer applied in this manner then solidifies to the finished sealing layer, which has the same function as the plastic covering of the dump according to FIG. 1 or the mineral, binder-impregnated sealing layer according to FIG. 4c. The surface of the sealing layer 22 which has been poured on can in turn be sealed with an inert substrate, which is then provided with structures in a similar manner to surfaces according to FIG. 1, in order to improve the static friction of the subsequent drainage layer 7.

Figure 6:
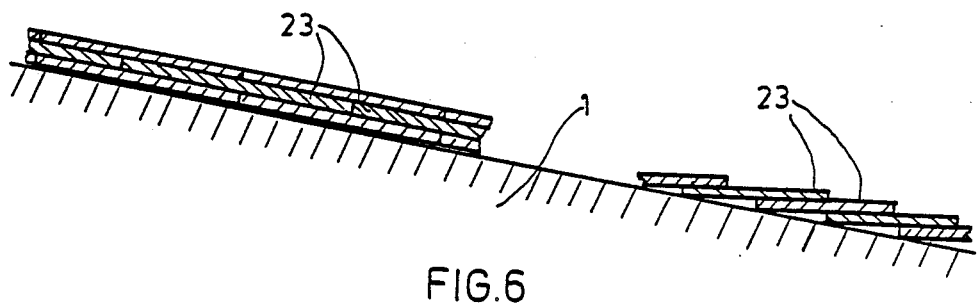

Another variant of the production of the intermediate seal is based on the use of slabs or blocks of finely divided building rubble, minerals resembling building rubble and/or excavated earth, the said slabs or blocks being compressed under high pressure and compacted by means of a binder. Such slabs or blocks are advantageously produced by means of hydraulic presses at pressures of 10 bar to 300 bar. According to FIG. 6, the slabs or blocks 23 are then laid on the surface of the waste layer 1, in the form of building blocks (left half of the Figure) or in the form of roofing tiles (right half of the Figure). In addition, the joints between the slabs or blocks 23 can be sealed by infiltration of a finely divided, hardening suspension by the method described with the aid of FIGS. 2 and 3.

In all variants of the intermediate seal which have been described (plastic covering 6 according to FIG. 1, filled mineral seal 13 according to FIG. 2 to FIG. 4 and slabs seal 23 according to FIG. 6), the intermediate seal is covered with a drainage layer 7 before further waste layers are deposited. The seepage water occurring in an intermediate seal is removed in each case via a pipe to a disposal system. This gives a multibarrier system which prevents seepage water from penetrating into the body of the dump, occupies a small volume and at the same time permits monitoring and disposal of seepage water penetrating into the dump and hence ensures high ecological safety.

We claim:

1. A process for intermediate sealing of upper waste layers of an operating dump and for the production of a multibarrier system to prevent the penetration of seepage water, comprising dumping at least a first of said waste layers at a waste disposal site, placing an intermediate covering having a drainage layer on the at least first of said waste layers, placing at least a second of said waste layers on said intermediate covering, and removing seepage water which has collected in the drainage layer and feeding same to a seepage water disposal system.

2. The process according to claim 1, wherein the intermediate layer comprises plastic films or plastic sheets overlapped in the manner of roofing tiles or laid as webs are used as the intermediate covering.

3. The process according to claim 2, wherein HDPE sheets or webs having a thickness of from 1 to 3 mm are used as the plastic.

4. The process according to claim 1, wherein layers which predominantly consist of wastes including at least one of building rubble, minerals resembling building rubble and excavated earth are applied as the intermediate covering.

5. The process according to claim 4, wherein a finely divided, hardening, water-insoluble suspension is infiltrated into the intermediate covering consisting of a layer of building rubble, mineral material resembling building rubble or excavated earth.

6. The process according to claim 5, wherein the suspension is sucked into the waste layer under reduced pressure by a vacuum lance inserted into the waste layer.

7. The process according to claim 5, wherein the suspension is forced into the waste layer under excess pressure by a bell placed on the waste layer.

8. The process according to claim 5, wherein the intermediate seal is produced by pouring on an initially free-flowing and subsequently solidifying layer of wastes.

9. The process according to claim 8, wherein the free-flowing suspension is pumped by a fan jet onto the waste.

10. The process according to claim 1, wherein the drainage layer comprises a plant substrate of the particle fractions sand and gravel, at least 95% of the said fractions being in the size range from 0.06 mm to 40 mm.

11. The process according to claim 10, wherein the drainable plant substrate layer is applied in a height of 20 to 100 mm.

12. The process according to claim 1, wherein rough and porous rocks comprise the material for the drainable plant substrate.

13. The process according to claim 1, wherein the intermediate sealing surface attaches to the drainable substrate layer.

14. The process according to claim 1, wherein the intermediate seal is laid on the waste layer in the form of building blocks or roofing tiles by installing glass or blocks of wastes including at least one of building rubble, minerals resembling building rubble and excavated earth, which have been compressed under high pressures of 10 to 300 bar and to which binders have been added.

15. The process according to claim 14, wherein joints between the slabs or blocks are sealed by infiltrating them with a finely divided suspension.

16. The process according to claim 1, wherein the drainage layer comprises a plant substrate of the particle fractions sand and gravel at least 95% of the said fractions being in the size range from 1 mm to 20 mm.

17. The process according to claim 16, wherein the drainable plant substrate layer is applied in a height of 30 to 50 mm.

18. The process according to claim 1, wherein the intermediate seal is laid on the waste layer in the form of building blocks or roofing tiles by installing glass or blocks of wastes including at least one of building rubble, minerals resembling building rubble and excavated earth, which have been compressed under high pressures of 50 to 200 bar and to which binders have been added.

* * * * *